United States Patent
Horiuchi et al.

[11] Patent Number: 5,903,375
[45] Date of Patent: May 11, 1999

[54] SURVEILLANCE METHOD OF OPTICAL COMMUNICATION LINE

[75] Inventors: Yukio Horiuchi, Niza; Shu Yamamoto, Shiki, both of Japan

[73] Assignee: Kokusai Denshin Denwa Kabushiki Kaisha, Tokyo, Japan

[21] Appl. No.: 08/778,249

[22] Filed: Jan. 8, 1997

[30] Foreign Application Priority Data

Jan. 12, 1996 [JP] Japan .................................. 8-021902

[51] Int. Cl.$^6$ .................................................. H04B 10/17
[52] U.S. Cl. .......................... 359/177; 359/130; 359/337; 359/339; 359/341
[58] Field of Search .................................. 359/110, 130, 359/161, 177, 341, 339, 337, 349; 385/37; 356/73.1

[56] References Cited

U.S. PATENT DOCUMENTS

| | | | |
|---|---|---|---|
| 5,187,362 | 2/1993 | Keeble | 356/73.1 |
| 5,557,400 | 9/1996 | Sorin et al. | 356/73.1 |
| 5,726,784 | 3/1998 | Alexander et al. | 359/130 |
| 5,757,487 | 5/1998 | Kersey | 356/345 |
| 5,771,250 | 6/1998 | Shigehara et al. | 385/37 |

*Primary Examiner*—Leslie Pascal
*Attorney, Agent, or Firm*—Pollock, Vande Sande & Amernick

[57] ABSTRACT

To enable the surveillance of a long-distance optical fiber line that a method using the reflection lights and Rayleigh backscatter lights cannot cover, a plurality of optical reflection elements P1–Pn are interposed in the optical fiber line at each specific distance. Each of the optical reflection elements P1–Pn reflects only a light signal of one of specific wavelengths $\lambda 1$–$\lambda n$ on a constant level. Light pulses of the specific wavelengths $\lambda 1$–$\lambda n$ are transmitted to the optical fiber line to measure intensities of the light pulses reflected by the optical reflection elements P1–Pn. From the measurement, surveillance of the optical fiber line can be done between the transmitter and each of positions of the optical reflection elements P1–Pn. The reflectance of the optical reflection elements P1–Pn can be set to 100%, and the surveillance becomes possible even if the length of the optical fiber line exceeds 200 km.

2 Claims, 8 Drawing Sheets

FIG.1 (A)

FIG.1 (B)     ▭ OPTICAL REFLECTION ELEMENT

FIG.2 (A)

FIG.2 (B)     ▭ OPTICAL REFLECTION ELEMENT

SURVEILLANCE METHOD OF OPTICAL COMMUNICATION LINE

BACKGROUND OF THE INVENTION

1. Field of the Invention

The present invention relates to a surveillance method for detecting faults and fault locations in an optical fiber line of a nonrepeating optical communication line, bi-directional optical communication line, or optical communication line provided with an optical amplifier repeater, and a method of surveilling the gain and loss and the like of optical circuits including optical amplifiers interposed in the optical fiber line.

2. Description of the Related Art

Figure 8:
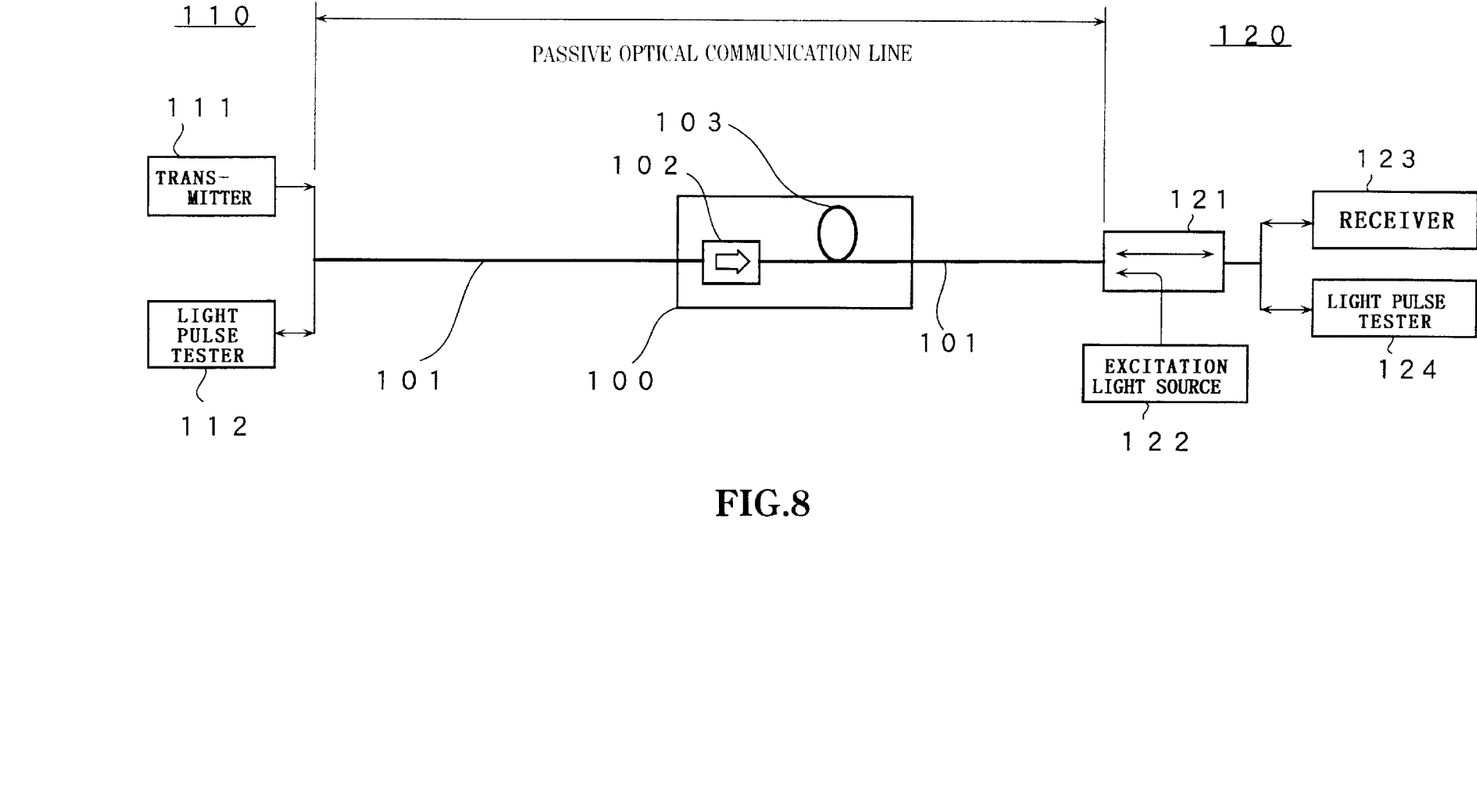
FIG. 8 is a block diagram showing a construction of a conventional nonrepeating optical communication system.

FIG. 8 illustrates a construction of an optical communication line to which a conventional surveillance method is applied. As shown in this figure, a transmitter terminal equipment 110 is connected to one end of an optical fiber line 101, and a receiver terminal equipment 120 is connected to another end of the optical fiber line 101 so as to communicate between both equipments. A remotely pumped optical amplifier 100 is interposed in the optical fiber line 101. The remotely pumped optical amplifier 100 is constructed so as to cascade an erbium doped fiber (EDF) 103 and an optical isolator 102.

The transmitter terminal equipment 110 is provided with a transmitter 111 for transmission of a light signal modulated by transmission data to the optical fiber line 101 and an optical time domain reflectometer (OTDR) 112 that transmits a light pulse to the optical fiber line 101, measures reflection lights and Rayleigh backscatter lights generated therein, and, based on the measurement, surveys the optical fiber line 101 on the side of the transmitter terminal equipment 110.

The receiver terminal equipment 120 is provided with a pump light source 122 for supplying a pump light to the remotely pumped optical amplifier 100, a wavelength multiplexer 121 for transmitting the pump light from the pump light source 122 to the optical fiber line 101, a receiver 123 for receiving and demodulating the light signal transmitted through the optical fiber line 101, and an OTDR 124 for surveying the optical fiber line 101 on the side of the receiver terminal equipment 120 based on the measurement of the reflection lights and Rayleigh backscatter lights.

The optical isolator 102 disposed before the EDF 103 has an optical amplification function to prevent the deterioration of transfer characteristics of the remotely pumped optical amplifier 100 due to the reflection lights and Rayleigh backscatter lights and the like generated in the optical fiber, and it also functions to confine the direction in which light signals propagate.

Although FIG. 8 shows only one-way (the ascent or descent) of the communication line, a bi-directional optical communication line may be formed using the same construction as in FIG. 8.

The optical fiber line 101 is an optical communication line as described above, and the length of the line is, for example, about 400 km. In this case, the remotely pumped optical amplifier 100 consisting of the EDF 103 and the optical isolator 102 is placed within about 100 km from the receiver terminal equipment 120 in consideration of a propagation loss of pump light propagating through the optical fiber line 101 from the pump light source 122.

Figure 9:
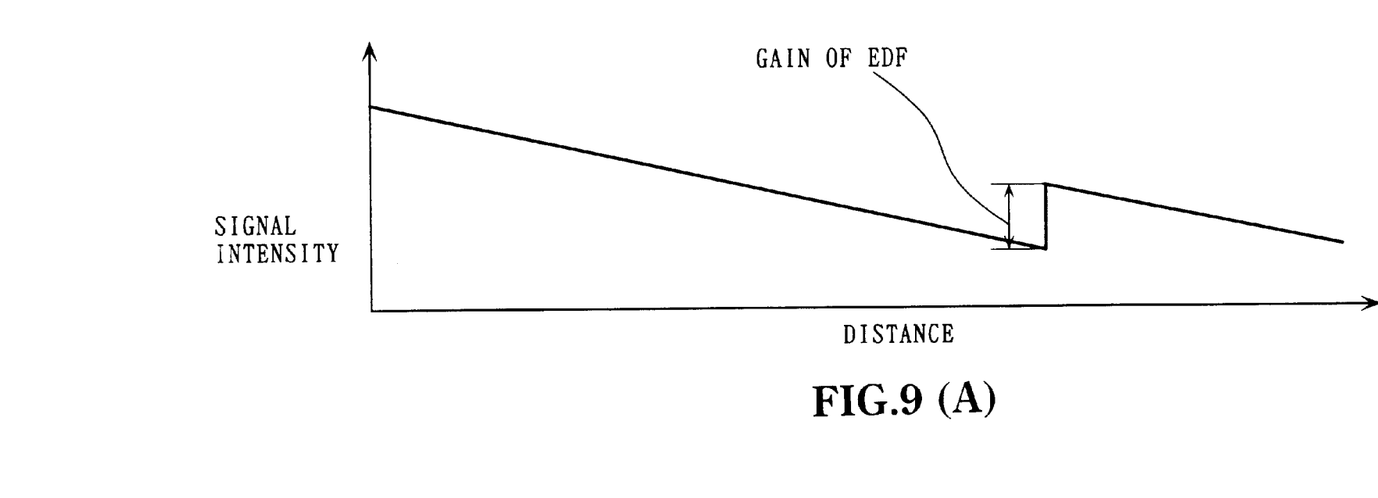
FIG. 9(A) is a chart showing an intensity curve of a signal propagated in the conventional nonrepeating optical communication system.
FIG. 9(B) is a chart showing the surveillance range achieved by use of reflection lights and Rayleigh backscatter lights.

As shown in FIG. 9(A) signal intensity attenuates in dependence on the propagation distance of a light signal propagating through the optical fiber line 101. The intensity of the light signal attenuates in proportional to the propagation distance owing to the propagation loss given by the optical fiber line 101. The light signal, however, is optically amplified by the remotely pumped optical amplifier 100 to recover the signal intensity at the position where the remotely pumped optical amplifier 100 is interposed.

The surveillance method in the optical communication line thus constructed will now be described. The OTDR 112 provided in the transmitter terminal equipment 110 transmits a light pulse to the optical fiber line 101, and measures the intensity of weak reflection lights and Rayleigh backscatter lights on the time domain as a portion of the Rayleigh scattering light generated by fluctuation of refractive index in the optical fiber line 101, returning to the input.

Since the measurement dynamic range of the OTDR 112 is about 40 dB at the highest, it is impossible to measure the whole section of the nonrepeating optical communication line over 400 km. That is, if the propagation loss of the optical fiber is 0.2 dB/km, the measurable range of the reflection lights and Rayleigh backscatter lights is about 200 km. The reflection lights and Rayleigh backscatter lights received over 200 km becomes so weak as to be buried under noises and discrimination is almost impossible.

In this manner, the OTDR 112 provided in the transmitter terminal equipment 110 surveys the optical fiber line 101 within about 200 km from the transmitter terminal equipment 110 by measuring reflection lights and Rayleigh backscatter lights.

The OTDR 124 provided in the receiver terminal equipment 120 transmits a light pulse to the optical fiber line 101, and measures the intensity of reflection lights and Rayleigh backscatter lights on the time domain returning to the input. In this case, since the optical isolator 102 is interposed at a position of about 100 km from the receiver terminal equipment 120, the light pulse used for measurement does not propagate over the optical isolator 102; and therefore, the OTDR 124 surveys the optical fiber line 101 only up to the optical isolator 102.

In the conventional optical communication line, the optical fiber line 101 is surveyed as described above, and the range of about 100 km from a position over 200 km from the transmitter terminal equipment 110 to a position where the optical isolator 102 is interposed becomes out of surveillance, as shown in FIG. 9(B).

If the receiver 123 surveys a reception level in order to survey the operation of the EDF 103 of the remotely pumped optical amplifier 100, it is impossible to discriminate whether a fluctuation of the reception level results from the transfer characteristics of the EDF 103 or from the optical fiber line 101.

SUMMARY OF THE INVENTION

The present invention has been made in view of the foregoing problems, and an object of the present invention is to provide a surveillance method that makes it possible to survey an optical communication line through the whole line and to survey the transfer characteristics when an optical amplification means is interposed in the optical fiber line.

In order to accomplish the aforementioned object, in the first surveillance method of an optical communication line according to the present invention, optical reflection elements are interposed at constant intervals, or at a plurality of optional positions in an optical fiber line, and every optical reflection element therein reflects only a light signal of one specific wavelength on a constant level. A light signal of the specific wavelength is transmitted to the optical fiber line to measure each of the intensities of reflected lights from the optical reflection elements and/or to observe each of aging characteristics of the intensities of the reflected lights. On the basis of the measurement and/or observation, sections in fault are determined and a state of the line is surveyed.

In the second surveillance method of an optical communication line according to the present invention, optical reflection elements are interposed at constant intervals or at a plurality of optional positions in an optical fiber line, and each of the optical reflection elements reflects only a light signal of one of a plurality of specific wavelengths different from one another on a constant level. The light signals of the specific wavelengths different from one another reflected by the optical reflection elements are transmitted to the optical fiber line, to measure each of the intensities of reflected lights from the optical reflection elements and/or to observe each of the aging characteristics of the intensities of the reflected lights. On the basis of the measurement and/or observation, sections in fault are determined and a state of the line is surveyed.

In the third surveillance method of an optical communication line according to the present invention, optical reflection elements are interposed at constant intervals or at a plurality of optional positions in an optical fiber line, and every optical reflection element therein reflects only a light signal of one specific wavelength on a constant level. Furthermore, optical reflection elements are interposed at constant intervals or at a plurality of optional positions in the optical fiber line, and each of the optical reflection elements reflects only a light signal of one of a plurality of specific wavelengths different from one another on a constant level. The light signals of the specific wavelengths that the optical reflection elements each reflect are transmitted to the optical fiber line to measure each of the intensities of reflected lights from the optical reflection elements and/or to observe each of the aging characteristics of the intensities of the reflected lights. On the basis of the measurement and/or observation, sections in fault are determined and a state of the line is surveyed.

In the fourth surveillance method of an optical communication line according to the present invention, in an optical fiber line in which an optical fiber having a rare earth element doped to have an optical amplification function is disposed in the optical fiber line, optical reflection elements are interposed before and behind the optical fiber having the optical amplification function. Each of the optical reflection elements reflects only a light signal of one of a plurality of specific wavelengths different from each other on a certain level. The light signals of the specific wavelengths that the optical reflection elements reflect are transmitted to the optical fiber line, to measure each of the intensities of reflected lights from the optical reflection elements and/or to observe each of the aging characteristics of the intensities of the reflected lights. On the basis of the measurement and/or observation, a state of operation of the optical fiber having the optical amplification function is surveyed.

In the foregoing surveillance methods of an optical communication line, the optical reflection elements are optical fiber gratings.

According to the present invention as described above, since optical reflection elements reflecting light signals of specific wavelengths are interposed in the optical communication line and each of the intensities of reflected lights from the optical reflection elements is measured, an optical communication line can be surveyed which is too long to be covered by the prior art surveillance method using the reflection lights and Rayleigh backscatter lights.

Furthermore, since optical reflection elements are interposed before and behind the optical amplification means and each of the intensities of reflected lights from the optical reflection elements is measured, the level difference of light signals before and behind the optical amplification means can be measured so that the transfer characteristics of the optical amplification means can be surveyed.

BRIEF DESCRIPTION OF THE DRAWINGS

The present invention will be fully understood from the detailed description given below and from the accompanying drawings of the preferred embodiments of the invention, which, however, should not be taken to limit the specific embodiment, but are for explanation and understanding, in which.

DESCRIPTION OF THE PREFERRED EMBODIMENT

The principle of the surveillance method of an optical communication line according to the present invention will be described with reference to FIG. 1 and 2.

Figure 1:
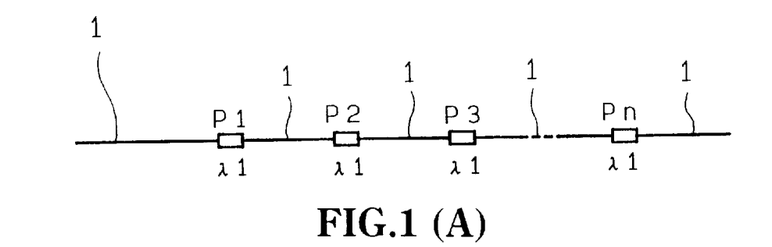
FIG. 1(A) and FIG. 1(B) are charts for explaining the principle of a surveillance method of an optical communication line relating to the present invention.
Figure 2:
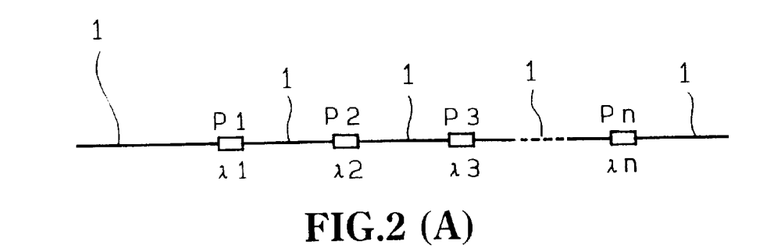
FIG. 2(A) and FIG. 2(B) are charts for explaining the principle of another surveillance method of an optical communication line relating to the present invention.

FIG. 1 illustrates the principle of the surveillance method of an optical communication line relating to the first embodiment, and FIG. 2 illustrates the principle of the method relating to the second embodiment.

As shown in FIG. 1(A), a plurality of optical reflection elements P1, P2, P3, . . . Pn are interposed, for example, at every specific distance in an optical fiber line 1. These optical reflection elements P1, P2, P3, . . . Pn reflect only a light signal of one specific wavelength, and the optical fiber gratings are applied to these in an example. The optical reflection elements P1, P2, P3, . . . Pn shown in FIG. 1 are designed to reflect a light signal of a wavelength $\lambda 1$, and all the wavelengths that the optical reflection elements P1, P2, P3, . . . Pn each reflect are designed to be identical.

The pulse tester transmits a light pulse of the specific wavelength $\lambda 1$ to the optical fiber line 1 in the direction of the arrow shown in FIG. 1(B). As the light pulse of the specific wavelength $\lambda 1$ propagates through the optical fiber line 1, a part of the light pulse transmits corresponding to a transmittance of the optical reflection element P1 through a position where the optical reflection element P1 reflecting the light pulse of the wavelength $\lambda 1$ is interposed in the optical fiber line 1, and the rest is reflected back from the P1 position. As the transmitted light further propagates, a part of the transmitted light transmits through a position where the optical reflection element P2 is interposed, and the rest reflects back from the P2 position. Thus, the transmitted light propagates toward the right as shown in FIG. 1(B), and every time the light transmits through one of the optical reflection elements P1, P2, P3, . . . Pn, the light intensity attenuates corresponding to the reflectance thereof.

The reflected lights each return toward the OTDR, as shown in FIG. 1(B). Since the optical reflection elements P1, P2, P3, . . . Pn are interposed in the returning path of the reflected lights, the reflected lights fall on the optical reflection elements, parts of which transmit through the optical reflection elements corresponding to the transmittances of the optical reflection elements to be secondary transmitted lights, and the rests are reflected to be secondary reflected lights. The secondary transmitted lights propagate toward the OTDR and the secondary reflected lights propagate toward the right on the drawing. That is, multiple reflections occur in the sections formed by neighboring two of the optical reflection elements P1, P2, P3, . . . Pn, and the transmitted and reflected lights overlap and propagate through the optical fiber line 1 in both directions.

In this case, if the reflectance of each of the optical reflection elements P1, P2, P3, . . . Pn is, for example, 100%, components of lights transmitting through a reflection element to the next optical reflection element will be null; and 100% reflectance is not applicable.

If the reflectance is 50%, the light will be attenuated to about ½ every time the light transmits through one optical reflection element even in consideration for multiple reflections; and the incident light pulse on the last optical reflection element Pn will be attenuated to about (½)n. Therefore, the reflectance cannot be raised too high.

The OTDR receives a reflected light pulse of the specific wavelength $\lambda 1$ and measures the intensity. Here, a propagation delay time from a moment that the OTDR transmits a light pulse of the specific wavelength $\lambda \uparrow$ to a moment that the OTDR receives a reflected light pulse is equivalent to the time needed for the light pulse to propagate back and forth between the position where each of the optical reflection elements P1, P2, P3, . . . Pn is interposed in the optical fiber line 1 and the OTDR. The position where each of the optical reflection elements P1, P2, P3, . . . Pn is interposed in the optical fiber line 1 is known, that is, the propagation delay time is known in advance. Therefore, the intensity of the reflected light pulse is measured at the time equivalent to the propagation delay time of the reflected light pulse, and on the basis of the measurement surveillance can be done between a position where an optical reflection element is interposed in the optical fiber line 1 and the OTDR.

If a reflected light is detected with a desired level at a propagation delay time corresponding to a position where an optical reflection element is interposed, this means that there is no abnormality in the optical fiber line 1 between the position where the optical reflection element is interposed and the OTDR. However, if a reflected light is not detected, this means that a fault has occurred in the optical fiber line 1 between the position where the optical reflection element is interposed and the OTDR.

By using the foregoing method, the surveillance of the optical fiber line 1 may be performed by comparison of the reflected light intensity with the one at the time when the optical fiber line 1 was installed.

In this manner, the optical fiber line 1 can be surveyed over 200 km. This surveillance method uses only one wavelength for surveillance, which is preferable if there is a limitation to an adaptable number of wavelengths.

Figure 6:
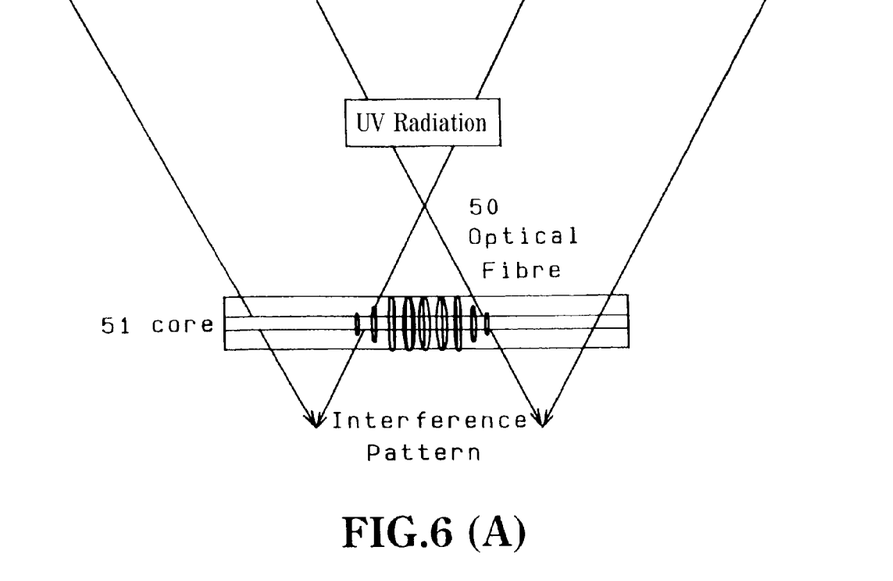
FIG. 6(A) is a chart for explaining an optical fiber grating.
FIG. 6(B) is a chart showing reflection characteristics of an optical fiber grating.

The optical fiber grating as one example capable of constructing the optical reflection elements P1, P2, P3, . . . Pn, will now briefly be described with reference to FIG. 6. As intensified ultraviolet (UV) lights are irradiated in two directions, as shown in FIG. 6(A), onto a quartz optical fiber 50 having a core 51 in which germanium is doped, an interference pattern is produced in a part where the ultraviolet lights are irradiated in both directions. At that moment, a change of composition having the same pattern as the interference pattern is produced in the optical fiber 50, and the refractive index changes in the shape of the pattern. This represents an optical fiber grating.

FIG. 6(B) illustrates typical reflection characteristics of an optical fiber having an optical fiber grating. This figure represents the reflection characteristics when a grating length of the optical fiber is made to be 1.6 mm, and shows that lights reflect around the wavelength 1536.5 nm. The wavelength bandwidth of 0.1 nm to 10 nm can be obtained as reflected waves.

Next, the principle of the surveillance method of an optical communication line relating to the second embodiment shown in FIG. 2 will be described.

In this surveillance method, a plurality of the optical reflection elements P1, P2, P3, . . . Pn are interposed, for example, at every specific distance in an optical fiber line 1 as shown in FIG. 2(A). Each of these optical reflection elements P1, P2, P3, . . . Pn reflects only a light signal of a specific wavelength, and the optical fiber gratings are applied to these as an example. Specific wavelengths of light signals that the optical reflection elements P1, P2, P3, . . . Pn each reflect are designed to be $\lambda 1, \lambda 2, \lambda 3, \ldots \lambda n$, different from one another.

In this case, the OTDR transmits light pulses of plural wavelengths $\lambda 1, \lambda 2, \lambda 3, \ldots \lambda n$ to the optical fiber line 1. Then, the light pulses of plural wavelengths $\lambda 1, \lambda 2, \lambda 3, \ldots \lambda n$ propagate through the optical fiber line 1, and the light pulses are each reflected individually by the optical reflection elements P1, P2, P3, . . . Pn interposed in the optical fiber line 1 to return toward the transmitter side, as shown in FIG. 2(B). In this case, the reflectance of each of the optical reflection elements P1, P2, P3, . . . Pn can be set to about 100%. This is because only one each of the optical reflection elements P1, P2, P3, . . . Pn each reflecting light pulses of specific wavelengths $\lambda 1, \lambda 2, \lambda 3, \ldots \lambda n$ is interposed in the optical fiber line 1.

The OTDR receives reflected lights of the specific wavelengths $\lambda 1, \lambda 2, \lambda 3, \ldots \lambda n$ and measures each of the intensities thereof. In an example, the OTDR transmits a light pulse of the specific wavelength λ1 and measures an intensity of the reflected light pulse from the optical reflection element P1 for reflecting the light pulse of the specific wavelength λ1 after a propagation delay time needed for the light pulse to travel back and forth between the OTDR and the position where the optical reflection element P1 is interposed in the optical fiber line 1. From this measurement, the surveillance can be performed between the OTDR and the position where the optical reflection element P1 is interposed in the optical fiber line 1. In the same manner, intensities of reflected lights from the optical reflection elements P2, P3, . . . Pn are measured after each of the propagation delay times needed for each of the light pulses to travel back and forth between the OTDR and each of the positions where the optical reflection elements P2, P3, . . . Pn are interposed in the optical fiber line 1. Based on the measurement, surveillance can be performed between the OTDR and each of the positions where the optical reflection elements P2, P3, . . . Pn are interposed in the optical fiber line 1.

If a reflected light of a specific wavelength is detected with a desired level, the optical fiber line 1 between the position where the optical reflection element for reflecting the specific wavelength is interposed and the OTDR can be judged to have no abnormality. If a reflected light is not detected, then it can be judged that a fault has occurred in the optical fiber line 1 between the position where the optical reflection element for reflecting the specific wavelength is interposed and the OTDR.

In this case, the surveillance of the optical fiber line 1 may be performed by the comparison of each reflected light intensity with one at the time when the optical fiber line 1 was installed.

In this manner, the optical fiber line 1 can be surveyed; and if the reflectance of each of the optical reflection elements P1, P2, P3, . . . Pn is set to about 100%, the length of the optical fiber line 1 is set to 300 km, and the propagation loss of the optical fiber line 1 is set to 0.2 dB/km, the OTDR will receive a light pulse attenuated by 120 dB against a level that the OTDR transmitted. And if the reflectance of each of the optical reflection elements P1, P2, P3, . . . Pn is set to about 1%, the length of the optical fiber line 1 is set to 300 km, and the propagation loss of the optical fiber line 1 is set to 0.2 dB/km, the OTDR will receive a light pulse attenuated by 140 dB against a level that the OTDR transmitted. Accordingly, the optimum reflectance will be decided in consideration of the characteristics of the optical fiber line 1, the dynamic range of the OTDR, and intensity levels of light pulses transmitted from the OTDR.

The principle of the surveillance method of the present invention has been described hereinbefore, and if the wavelengths that the optical reflection elements reflect are other than the wavelengths of transmission signals, the surveillance method will not influence the transmission characteristics and in-service surveillance will be made possible.

Figure 3:
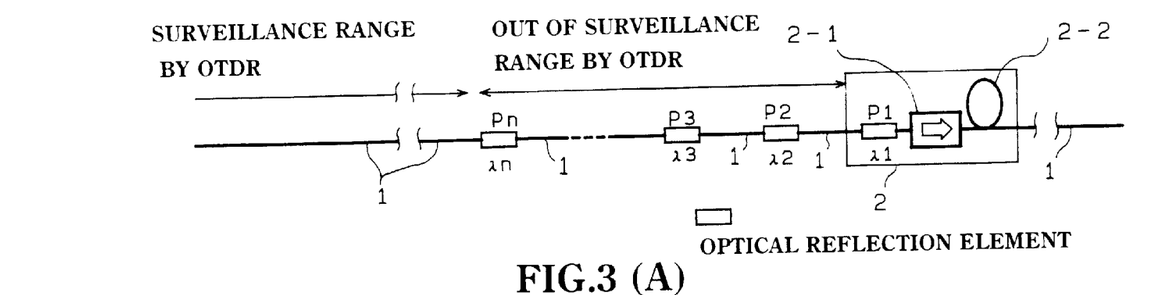
FIG. 3(A) is a diagram showing a construction of a nonrepeating optical communication line in which a surveillance method of the optical communication line relating to the present invention is applied.
FIG. 3(B)–FIG. 3(E) are charts showing waveforms of reflected lights from optical reflection elements.

Next, FIG. 3 illustrates a construction when the principle of the surveillance method of the optical communication line relating to the second embodiment of the present invention shown in FIG. 2 is applied to an optical communication line and the intensities of reflected lights in that case.

The principle of the surveillance method shown in FIG. 3 is the same as that shown in FIG. 2 described above, and detailed description of the surveillance method will be omitted. In FIG. 3, the optical fiber line 1 is equipped with a remotely pumped optical amplifier 2 which is composed of an erbium doped fiber (EDF) 2-2 and an optical isolator 2-1.

The optical reflection elements P1, P2, P3, . . . Pn are not interposed within the range (about 200 km) on the optical fiber line 1 in which surveillance becomes possible by using reflection lights and Rayleigh backscatter lights, but are interposed in the range of the optical fiber line 1 where surveillance is impossible by using the OTDR. By way of example, the optical fiber gratings are applied to these optical reflection elements P1, P2, P3, . . . Pn. Specific wavelengths of light signals that the optical reflection elements P1, P2, P3, . . . Pn each reflect are designed to be λ1, λ2, λ3, . . . λn, different from one another. Furthermore, the optical reflection element P1 is disposed inside the remotely pumped optical amplifier 2, and following it, the optical reflection elements P2, P3, . . . Pn are disposed in series toward the transmitter terminal equipment where the OTDR is installed.

Here, as the OTDR transmits a light pulse of the specific wavelength λ1, the optical reflection element P1 disposed inside the remotely pumped optical amplifier 2 reflects the light pulse of the wavelength λ1 to return the reflected light pulse toward the OTDR. This reflected light pulse is, as shown in FIG. 3(B), reflected at the position where the optical reflection element P1 is interposed. The position where the optical reflection element P1 is interposed is out of the range in which surveillance by the OTDR is possible and where weak reflection lights and Rayleigh backscatter lights and the like are buried under noises; and therefore, only the reflected light pulse of the wavelength λ1 can be detected as an isolated pulse.

As the OTDR transmits a light pulse of the specific wavelength λn, the optical reflection element Pn disposed on the optical fiber line 1 reflects the light pulse of the wavelength λn to return the reflected light pulse toward the OTDR. This reflected light pulse is, as shown in FIG. 3(C), reflected at the position where the optical reflection element Pn is interposed shortly over 200 km, and the intensity level of this reflected light pulse is higher than that of the reflected light pulse of the wavelength λ1. However, the position where the optical reflection element Pn is interposed is out of the range in which surveillance by the OTDR is possible and weak reflection lights and Rayleigh backscatter lights and the like are buried under noises; and therefore, only the reflected light pulse of the wavelength kn can be detected as an isolated pulse.

Next, as the OTDR transmits a light pulse of the specific wavelength λ3, the optical reflection element P3 disposed on the optical fiber line 1 reflects the light pulse of the wavelength λ3 to return the reflected light pulse toward the OTDR, as shown in FIG. 3(D).

Furthermore, as the OTDR transmits a light pulse of the specific wavelength λ2, the optical reflection element P2 disposed on the optical fiber line 1 reflects the light pulse of the wavelength λ2 to return the reflected light pulse toward the OTDR, as shown in FIG. 3(E).

Both of the reflected light pulses are reflected at the positions where the optical reflection elements P2, P3 are interposed over 200 km, and weak reflection lights and Rayleigh backscatter lights and the like are buried under noises; and therefore, only the reflected light pulse of the wavelength λ2, or λ3 can be detected as an isolated pulse.

As clearly observed in FIG. 3(B)–(E), the surveillance method of the optical communication line according to the present invention enables surveillance in the range of the optical fiber line 1 where it is not possible to effect surveillance by detecting reflection lights and Rayleigh backscatter lights, by measuring the intensities of reflected light pulses.

Next, in the surveillance method of the optical communication line according to the present invention, another embodiment in which an optical amplification means is put under surveillance will be described with reference to FIG. 4.

In an optical communication system shown in FIG. 4(A), one end of a transmitting side optical fiber line 1-1 connects with a transmitter 11 for transmitting a transmission signal of a 1.55 μm wavelength band, and the other end connects with a remotely pumped optical amplifier 2. The transmitting side optical fiber line 1-1 is, for example, 300 km long.

The output of the remotely pumped optical amplifier 2 connects with one end of a receiving side optical fiber line 1-2 through which the transmission signal of 1.55 μm wavelength band propagates. The other end of the receiving side optical fiber line 1-2 connects with a wavelength multiplexer 21 provided on the receiving side.

This wavelength multiplexer 21 receives pump light of 1.48 μm wavelength band supplied by a pump light source 22, the wavelength multiplexer 21 transmits the pump light of 1.48 μm wavelength band to the optical fiber line 1-2, and the pump light propagates through optical fiber line 1-2 of, for example, 100 km in length to be received by the remotely pumped optical amplifier 2. Here, an erbium doped fiber (EDF) 2-2 inside the remotely pumped optical amplifier 2 is pumped by the pump light of 1.48 μm wavelength band, and accordingly the EDF2-2 amplifies the received transmission signal of 1.55 μm wavelength band.

An optical isolator 2-1 inside the remotely pumped optical amplifier 2 is used to prevent the deterioration of the transfer characteristics of the remotely pumped optical amplifier 2 due to the reflection lights and Rayleigh backscatter lights and the like, and to control the signal propagation direction.

Furthermore, the remotely pumped optical amplifier 2 is equipped with an optical reflection element R1 interposed on the input of the EDF2-2 and an optical reflection element R2 on the output. The specific wavelengths that the optical reflection elements R1, R2 reflect are $\lambda 1$, $\lambda 2$, respectively.

The transmission signal of 1.55 μm wavelength band amplified by the remotely pumped optical amplifier 2 propagates through the receiving side optical fiber line 1-2 to be received by the wavelength multiplexer 21, from which the transmission signal is guided to a receiver 23. The receiver 23 demodulates the received transmission signal. The wavelength multiplexer 21 also connects with an OTDR 24.

This OTDR 24 transmits light pulses of the wavelengths $\lambda 1$ and $\lambda 2$ to the receiving side optical fiber line 1-2 through the wavelength multiplexer 21, measures the intensities of the light pulses of the wavelengths $\lambda 1$ and $\lambda 2$ reflected by the optical reflection elements R1, R2, and thereby surveys the remotely pumped optical amplifier 2. If the wavelengths $\lambda 1$ and $\lambda 2$ are different from those of the transmission signals multiplexed in wavelength division as shown in FIG. 4(B), in-service surveillance will become possible.

The method of surveilling the remotely pumped optical amplifier 2 will now be described. The OTDR 24 transmits the light pulses of the wavelengths $\lambda 1$ and $\lambda 2$ to the receiving side optical fiber line 1-2 as shown in FIG. 4(B). The light pulses propagate through the optical fiber line 1-2, reach the remotely pumped optical amplifier 2 and then the light pulse of the wavelength $\lambda 2$ is reflected by the optical reflection element R2 to reversely propagate through the optical fiber line 1-2 to return to the receiving side.

When the light pulse of the wavelength $\lambda 1$ reaches the remotely pumped optical amplifier 2, the light pulse transmits through the optical reflection element R2, the light pulse is amplified by the EDF2-2 and is afterward reflected by the optical reflection element R1. The reflected light pulse is again amplified by the EDF2-2, and transmits through the optical reflection element R2 to reversely propagate through the optical fiber line 1-2 to return to the receiving side.

The reflected light pulse returned to the receiving side is guided to the OTDR 24 through the wavelength multiplexer 21. FIG. 4(C) illustrates an example of waveforms of the reflected light pulses that the OTDR 24 receives. The light pulse of the wavelength $\lambda 2$ is received after a propagation delay time that the light pulse needs to propagate back and forth through the receiving side optical fiber line 1-2, and the intensity is decreased owing to the propagation loss. The light pulse of the wavelength $\lambda 1$ is received after the foregoing propagation delay time plus a propagation delay time that the light pulse needs to propagate back and forth between the one end of the optical fiber line 1-2 and the EDF2-2. This light pulse is amplified each time it passes the EDF2-2, and it is received with an increased intensity amplified twice.

The level difference between the received light pulses of the wavelength $\lambda 1$ and $\lambda 2$ is equivalent to double of the amplification gain by the EDF2-2; and if the level difference is surveyed, the surveillance of the gain of the remotely pumped optical amplifier 2 will be possible.

Furthermore, the optical reflection elements R1, R2 have wavelengths different from each other, and there does not occur multiple reflections between the optical reflection elements R1 and R2 to deteriorate the transfer characteristics. Accordingly, the reflectance of the optical reflection elements R1, R2 can be set to 100%. The reflectance may be lowered if needed.

Figure 7:
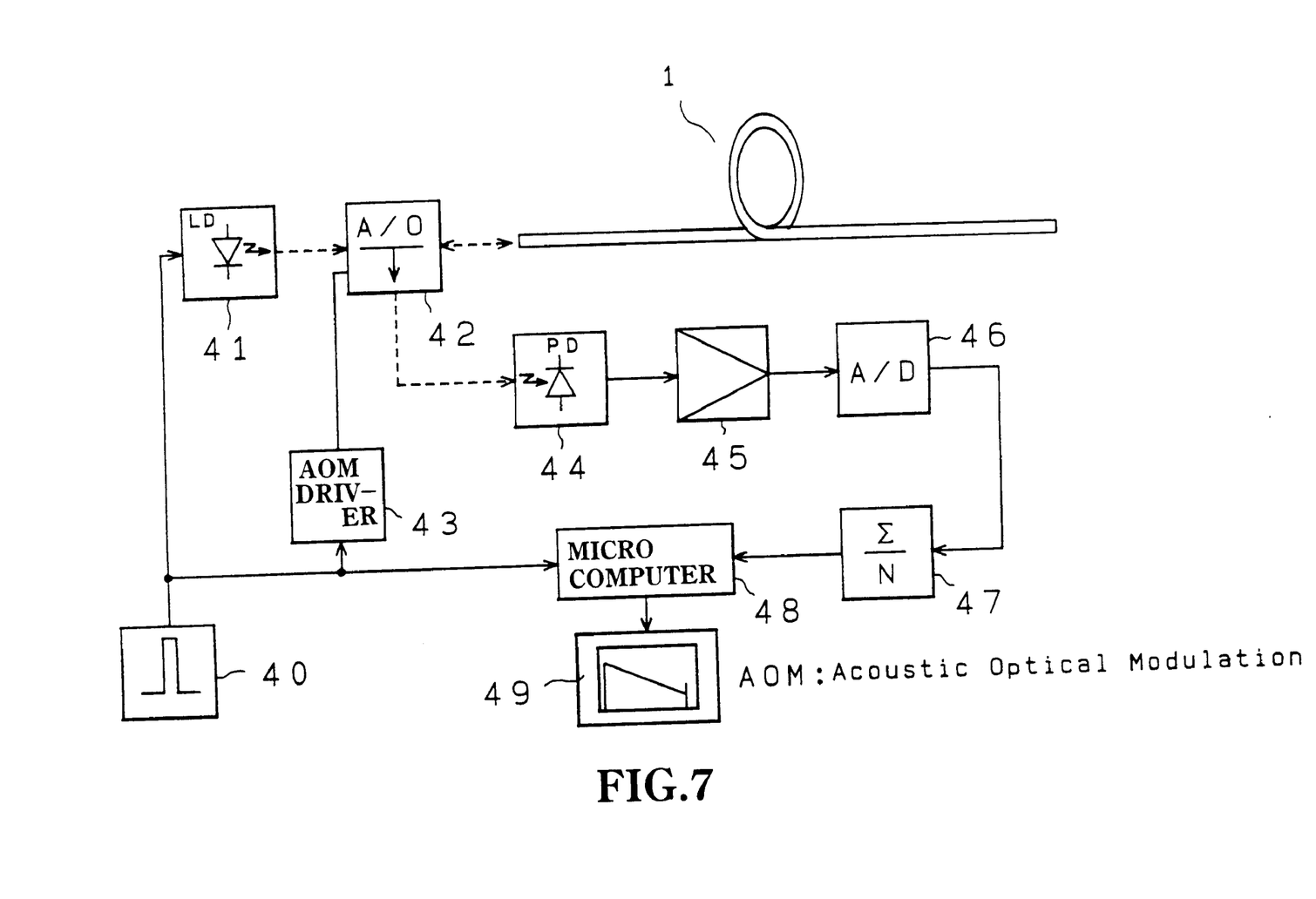
FIG. 7 is a block diagram showing a construction of the OTDR.

FIG. 7 illustrates a construction of the OTDR. In this figure, a pulse from a pulse generator 40 drives a variable wavelength light pulse source 41 to generate a laser light pulse of a specific wavelength. The light pulse source 41 is provided with a laser diode LD capable of varying its oscillation wavelength. This light pulse enters an AOM (acoustic optical modulation) optical switch 42, through which the light pulse is transmitted to this optical fiber line 1. The repetition period of this light pulse is set longer than a to-and-fro propagation delay time through the measured optical fiber line 1 to make the light pulse an isolated pulse. The AOM optical switch 42 switches the reflected light pulse, which is guided to a photodetector 44 composed of a photodiode (PD), received and transformed into an electric signal.

This electric signal is amplified by an amplifier 45, converted into a digital signal by an analog/digital (A/D) converter 46, and enters an equalizing processor 47. The data of reflected lights buried under noises are equalized in the equalizing processor 47, and the processed data are supplied to a microcomputer 48. Thereby, intensity levels of the reflected lights are obtained depending on the distances to the optical reflection elements on the optical fiber line 1, and the waveforms shown in FIG. 3(B)~(E) are displayed on a CRT 49.

The AOM optical switch 42 is controlled in switching by an AOM driver 43 to which the pulse from the pulse generator 40 is supplied as a timing signal.

In this case, the OTDR 24 receives not only reflected lights, but also reflection lights and Rayleigh backscatter lights in a slant waveform as shown in FIG. 3(B). The inclination of the waveform of the reflection lights and Rayleigh backscatter lights gives a rate of the propagation loss of the optical fiber line 1. Reading a propagation loss or a distinguished change of a propagation loss from a displayed waveform will give a connection or fracture point of the optical fiber line 1. Furthermore, reading a time (distance) and position of a reflected light and an intensity level and presence of a reflected light will give a fracture point and the like of the optical fiber line 1.

Figure 4:
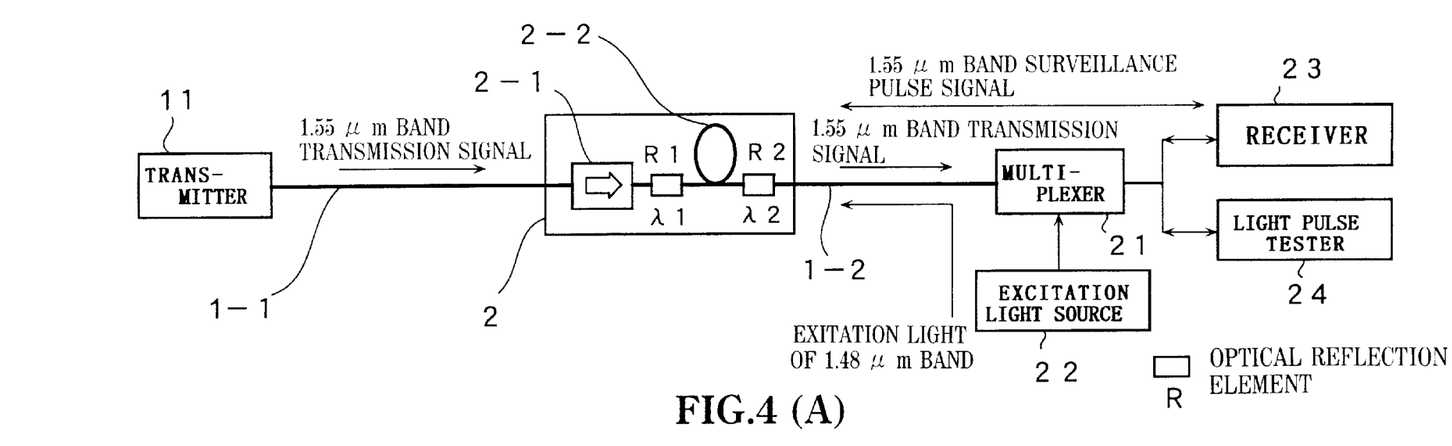
FIG. 4(A) is a diagram of a nonrepeating optical communication system in which another surveillance method of the optical communication line relating to the present invention is applied.
FIG. 4(B) and FIG. 4(C) are charts showing components of wavelengths propagating through the receiving side optical fiber line, and a chart showing waveforms received by the OTDR.
Figure 5:
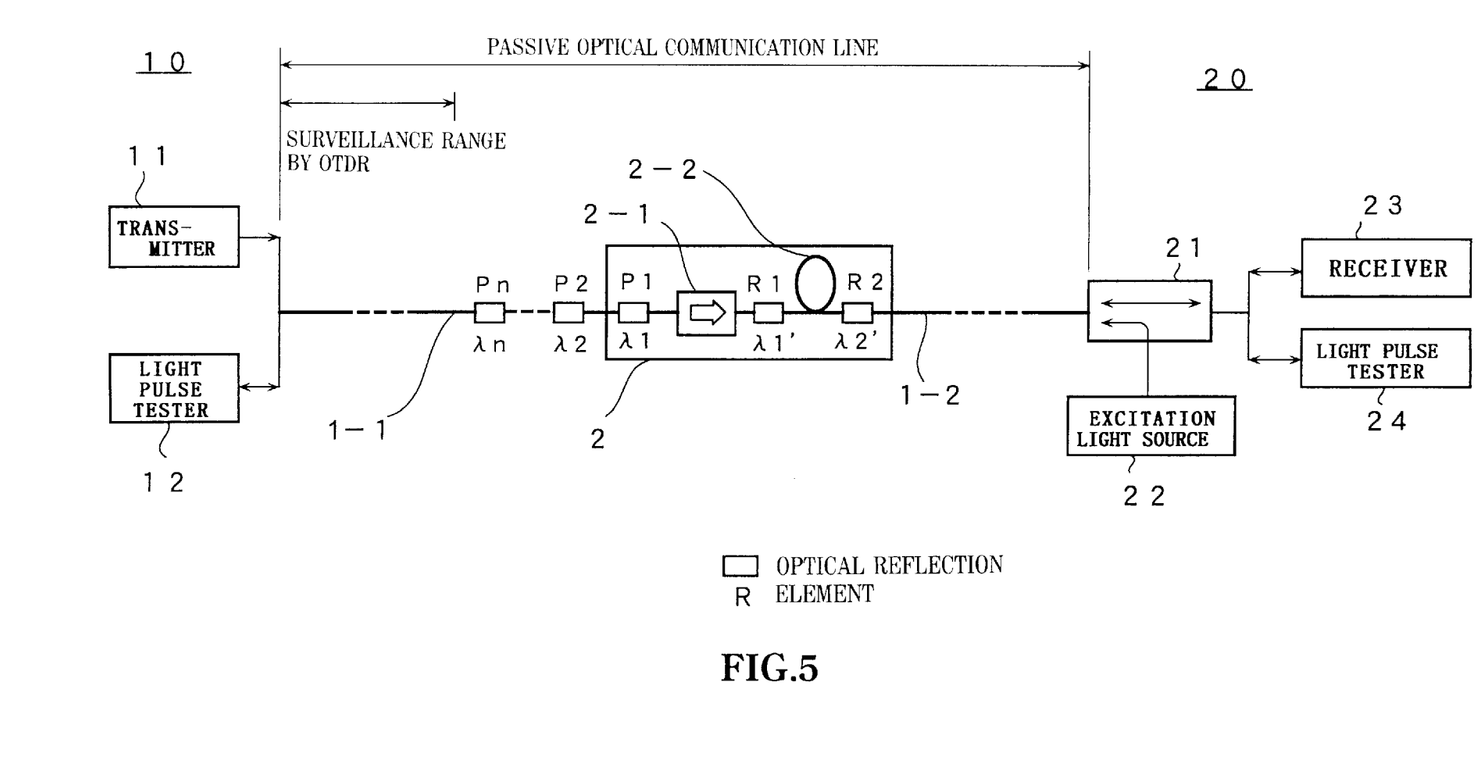
FIG. 5 is showing a construction of a nonrepeating optical communication system in which the surveillance methods of the optical communication line illustrated in FIG. 3 and FIG. 4 are applied.

Next, FIG. 5 illustrates a construction of a optical communication system to which the surveillance method of the optical communication line according to the present invention shown in FIGS. 3 and 4 is applied.

In the optical communication system, the total length of the optical fiber line is about 400 km, and a remotely pumped optical amplifier 2 is interposed in the optical fiber line. A transmitter terminal equipment 10 is provided with a transmitter 11 for transmitting a transmission signal and an OTDR 12 for surveying a transmitting side optical fiber line 1-1.

Furthermore, a receiver terminal equipment 20 is provided with a wavelength multiplexer 21, pump light source 22, receiver 23 for receiving the transmission signal, receiving side optical fiber line 1-2, and an OTDR 24 for surveying the remotely pumped optical amplifier 2.

The surveillance method of the optical communication system shown in FIG. 5 is a combination of the methods shown in FIG. 3 and 4, and the outline of the method will hereafter be described.

As the OTDR 12 transmits a light pulse of a specific wavelength $\lambda 1$ to the transmitting side optical fiber line 1-1, an optical reflection element P1 disposed inside the remotely pumped optical amplifier 2 reflects the light pulse of the wavelength $\lambda 1$. The OTDR 12 receives the reflected light pulse and the reflection lights and Rayleigh backscatter lights at the same time. Thus, the range of about 200 km where the optical reflection elements P1–Pn are not interposed can be surveyed by measuring the intensity of the reflection lights and Rayleigh backscatter lights, and the rest about 100 km to the remotely pumped optical amplifier 2 can be surveyed from the measurement of the intensity of light reflected by the optical reflection element P1.

When the OTDR 12 transmits light pulses of the specific wavelengths $\lambda 2$–$\lambda n$, the surveillance on the transmitting side optical fiber line 1-1 can be done to each of the positions where the optical reflection elements P2–Pn for reflecting the light pulses of the wavelengths $\lambda 2$–$\lambda n$, respectively, are interposed.

If there is a light pulse of a specific wavelength that is not received, it is found that there is a fault including a fracture of the line between the optical reflection element for reflecting the specific wavelength and an optical reflection element interposed before the optical reflection element.

As the OTDR 24 equipped in the receiver terminal equipment 20 transmits light pulses of wavelengths $\lambda 1'$, $\lambda 2'$ to a receiving side optical fiber line 1-2 through the wavelength multiplexer 21, the light pulses propagate through the receiving side optical fiber line 1-2, reach the remotely pumped optical amplifier 2, and the light pulse of the wavelength $\lambda 2$ is reflected by the optical reflection element R2.

As the light pulse of the wavelength $\lambda 1$ reaches the remotely pumped optical amplifier 2, it transmits through the optical reflection element R2 and is amplified by the EDF2-2 and then reflected by the optical reflection element R1. The reflected light is again amplified by the EDF2-2, transmits through the optical reflection element 2, and propagates through the optical fiber line 1-2 in the reverse direction toward the receiving side.

The reflected light pulse returned to the receiving side is guided to the OTDR 24 through the wavelength multiplexer 21.

Since the level difference between the received light pulses of the wavelengths $\lambda 1$ and $\lambda 2$ is equivalent to double of the amplification gain by the EDF2-2 as described above, the gain of the remotely pumped optical amplifier 2 can be surveyed from the surveillance of this level difference.

The OTDR 24 receives the reflection lights and Rayleigh backscatter lights, and the receiving side optical fiber line 1-2 of about 100 km long can be surveyed by reading the waveform of the reflection lights and Rayleigh backscatter lights.

The wavelength of transmission signals propagating through the transmitting side optical fiber line 1-1 and receiving side optical fiber line 1-2 is in a 1.55 $\mu$m band, and the pump light source 22 gives pump light of 1.48 $\mu$m band to the remotely pumped optical amplifier 2.

Furthermore, the wavelengths $\lambda 1$–$\lambda n$ for surveillance are different from the wavelength $\lambda 1'$ and $\lambda 2'$. Setting these wavelengths to wavelengths different from those of the transmission signals will enable in-service surveillance.

The reflectances of the optical reflection elements P1–Pn and the optical reflection elements R1, R2 can be set to 100%, enabling a long-distance surveillance of an optical fiber line.

The surveillance method of the optical communication line according to the present invention can be applied to detection of faults and fault locations in an optical fiber line of a long-distance nonrepeating optical communication line, bi-directional optical communication line, or an optical communication line provided with an optical amplifier repeater, and surveillance of the gain and loss and the like of optical circuits including optical amplifiers and the like interposed in the optical fiber line.

The surveillance method of the optical communication line according to the present invention is conducted as described herein above, and an optical communication line that is too long to be covered by a surveillance method using the reflection lights and Rayleigh backscatter lights can be surveyed through the whole line.

Furthermore, interposing the optical reflection elements before and behind the optical amplification means and measuring the intensities of reflected lights from the optical reflection elements can measure the level difference given by the optical reflection elements located before and behind the optical amplification means; and therefore, the transfer characteristics of the optical amplification means can be surveyed.

The means used for measurement of reflected lights from the optical reflection elements can also measure the reflection lights and Rayleigh backscatter lights, and the measurement means of the reflected lights can serve as the measurement means of the reflection lights and Rayleigh backscatter lights.

While the specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method of surveilling an optical fiber communication line in which an optical amplifier comprising an optical fiber having a rare earth element doped to have an optical amplification function is disposed, to effect surveillance of the amplification gain of said optical amplifier, comprising the steps of:

interposing optical reflection elements before and behind said optical fiber having the optical amplification function, each of the optical reflection elements reflecting only a light signal of one of a plurality of specific wavelengths different from each other on a constant level;

transmitting light signals of the specific wavelengths that the optical reflection elements reflect to the optical fiber line;

measuring the intensities of reflected lights from the optical reflection elements and/or observing the aging characteristics of the intensities of the reflected lights; and determining the amplification gain of said optical amplifier from said measurement and/or observation.

2. The surveillance method of claim 1, wherein the optical reflection elements are optical fiber gratings.

* * * * *